United States Patent [19]

Hinze et al.

[11] 4,341,670

[45] Jul. 27, 1982

[54] POLYAMIDE FROM DIAMINE, TRIAMINE AND POLYCARBOXYLIC ACID MIXTURE

[75] Inventors: Adriën G. Hinze, Dordrecht; Robert P. Roggeveen; Abraham J. Meulenberg, both of Gouda, all of Netherlands

[73] Assignee: Emery Industries, Inc., Cincinnati, Ohio

[21] Appl. No.: 141,235

[22] Filed: Apr. 17, 1980

[30] Foreign Application Priority Data

Apr. 17, 1979 [NL] Netherlands .......................... 7902972
Dec. 28, 1979 [GB] United Kingdom ................. 7944527

[51] Int. Cl.$^3$ ...................... C08L 91/00; C08G 69/26
[52] U.S. Cl. .................................... 528/338; 525/184; 528/342; 528/339.3
[58] Field of Search ...................................... 260/18 N

[56] References Cited

U.S. PATENT DOCUMENTS 3,433,853 6/1969 Earle et al. .......................... 525/184
4,191,669 3/1980 Hinze et al. ....................... 260/18 N

FOREIGN PATENT DOCUMENTS 1163266 9/1969 United Kingdom .

Primary Examiner—Harold D. Anderson
Attorney, Agent, or Firm—Kenneth D. Tremain

[57] ABSTRACT

By the incorporation of small amounts of specific polyamides into polyalkenes, such as polypropylene and polyethylene, it is possible to significantly improve the dyeing properties, including color intensity, color homogeneity and color fastness, of the polyalkene. Polyamides useful for this purpose are derived from mixed dicarboxylic acids, diamine and triamine containing two primary and one tertiary amine groups.

5 Claims, No Drawings

POLYAMIDE FROM DIAMINE, TRIAMINE AND POLYCARBOXYLIC ACID MIXTURE

BACKGROUND OF THE INVENTION

The application relates to polyamides of a certain structure and to polyalkenes in which small amounts of these polyamides have been incorporated so as to improve the dyeability of this polyalkene for acid dyestuffs.

It is generally recognized that polyalkenes have a poor dyeability because of the lack of polar groups which can function as points of attachment for dye molecules. Consequently, up to now much attention has been paid to the development of polyalkenes in which the desired polar groups are present and which as a result display good dyeability. Good dyeability is a collective name for good color intensity, a good homogeneity and a good color fastness of the dyed modified polyalkene.

In the literature various polyalkenes modified with basic polyamides have been described. British patent specification No. 1163266, for example, describes polyalkylene that has been modified with a basic compound, for example a polyamide, in which the basic nitrogen groups have been at least partly converted into a salt with the aid of a strong acid. The polyamide used in this manner is built up of aliphatic polyamines, preferably of the formulae:

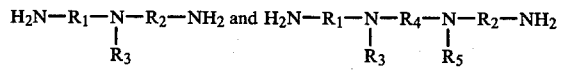

in which $R_1$, $R_2$ and $R_4$ are alkylene groups, preferably $C_1$-$C_6$, and $R_3$ and $R_5$ are a hydrogen atom or a $C_1$-$C_{16}$ alkyl group. Aliphatic, aromatic, cycloalkyl- and alkylaryldiamines can also be used. Carboxylic acids which can be reacted with the polyamines to obtain the polyamide modifiers include aliphatic acids such as succinic acid, glutaric acid, adipic acid, 2,2,4-trimethyl adipic acid, suberic acid, azelaic acid, sebacic acid and dodecanedioic acid, alkyl-substituted aliphatic dicarboxylic acids, dimeric unsaturated fatty acids, aromatic, cycloalkyl and alkylaryl dicarboxylic acids. For a satisfactory dyeing result, neutralization of the basic polyamides with a strong acid is considered necessary.

In U.S. Pat. No. 3,433,853 polyalkenes modified with basic polyamide are described wherein the polyamide is derived from a polyamine containing not more than two primary amino groups and one or more tertiary amino groups and a dicarboxylic acid, including aliphatic, aromatic and heterocyclic acids. One class of useful polyamines have the formula

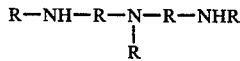

Diamines, particularly aliphatic diamines, can replace part of the polyamine. The Examples describe polyamides which are based on hexamethylenediamine, N,N'-bis(3-aminopropyl)methyl amine and either azelaic or sebacic acid (Example I and Example II(1), respectively).

The known modified polyalkenes, such as those described in the above-mentioned references are, however, not entirely satisfactory as far as their dyeability is concerned.

SUMMARY OF THE INVENTION

It has now been discovered that by modifying polyalkenes with certain novel polyamides, excellent dyeing properties such as color intensity, color homogeneity and color fastness can be obtained. The novel polyamide compositions according to the invention make it possible to obtain excellent dyeing results with low percentages being added. Also, it is not necessary to neutralize the polyamide to achieve these improved results. Adding low percentages is important because this minimizes the effect of the additive on the polyalkene and therefore does not significantly detract from the physical properties of the polymer.

These novel polyamides have an acid value below 15, preferably below 10, an amine number of 50–200 and more preferably of 75–150 (all in mg KOH/g) and are built up from groups derived from (a) an aliphatic diamine with 2-3 carbon atoms between the nitrogen atoms;

(b) a triamine of the formula

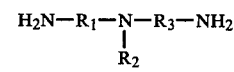

in which $R_1$ and $R_3$ represent alkylene groups and $R_2$ represents an alkyl group, which groups can contain 1 to 6 carbon atoms;

(c) an aliphatic dicarboxylic acid containing 6 to 19 carbon atoms; and (d) a polymerized fatty acid in an amount up to 35%, and more preferably 3–25 mol. %, of the total dicarboxylic acids. The molar ratio of the diamine (a) to triamine (b) will range from 0.4–1.5:1 and more preferably be 0.4–0.8:1.

DETAILED DESCRIPTION

By the present invention, improvement in the dyeability of polyalkenes is achieved by incorporating therein a small but effective amount of specific polyamides. Useful polyamides for the invention are derived from and obtained by the reaction of:

(a) an aliphatic diamine with 2-3 carbon atoms between the nitrogen atoms;

(b) a triamine of the formula

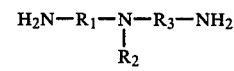

in which $R_1$ and $R_3$ represent alkylene groups and $R_2$ represents an alkyl group, which groups can contain 1 to 6 carbon atoms;

(c) an aliphatic dicarboxylic acid containing 6 to 19 carbon atoms; and (d) a polymerized fatty acid in an amount up to 25 mol percent of the total dicarboxylic acids.

More preferably the polymeric fatty acid (d) constitutes 3 to 25 mol percent of total dicarboxylic acids. Superior results are obtained when 15 to 25 mol percent polymeric fatty acid is employed with the aliphatic dicarboxylic acid (c). The molar ratio of aliphatic diamine (a) to triamine (b) can range from 0.4–1.5:1 but most generally will be 0.4–0.8:1.

The resulting polyamides have an acid value below 15, preferably below 10, an amine number of 50–200 and more preferably from 75 to 150. Acid values and amine values are stated in milligrams KOH per gram.

Useful diamines for the preparation of the polyamide will have 2 or 3 carbon atoms between the primary amino groups. There may, however, be branching on the 2 or 3 linear carbon atom chain, i.e. pendant lower alkyl groups. Preferably, when the diamines contain branching the pendant group will be a methyl group. The preferred aliphatic diamine is ethylenediamine, but propanediamine-1,2, propanediamine-1,3, 2-methylpropanediamine-1,3 and 2,2-dimethylpropanediamine-1,3 can also be used.

Suitable triamines are compounds of the formula

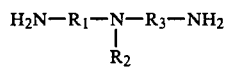

wherein $R_1$, $R_2$ and $R_3$ are saturated hydrocarbon radicals, branched or straight-chain, preferably containing 1 to 6 carbon atoms. More generally, $R_1$ and $R_3$ are alkylene groups having 2 to 4 carbon atoms and $R_2$ represents a methyl group. It is not necessary that $R_1$ and $R_3$ contain the same number of carbon atoms. Illustrative triamines which can be used include N,N'-bis(2-aminoethyl)methyl amine, N,N'-bis(4-aminobutyl)methyl amine, N,N'-bis(3-aminopropyl)ethyl amine, N,N'-bis(3-aminopropyl)methyl amine, and the like. Particularly useful results are obtained with N,N'-bis(3-aminopropyl)methyl amine.

Useful aliphatic dicarboxylic acids contain 6–19 carbon atoms and, more preferably 6–12 carbon atoms. Such acids include adipic acid, 2,2,4-trimethyladipic acid, suberic acid, azelaic acid, sebacic acid, dodecanedioic acid, brassylic acid, and the like. Aliphatic dicarboxylic acids having from 9 to 19 carbon atoms give particularly desirable results.

Polymerized fatty acids suitable for use can be any of the known products obtained from the thermal or catalytic polymerization of unsaturated fatty acids having 16–22 carbon atoms, preferably 18 carbon atoms. The polymeric fatty acids will contain at least 75% by weight dimeric fatty acids, the balance being predominantly trimeric fatty acids. In the situation where a $C_{18}$ unsaturated fatty acid, such as oleic or linoleic acids or mixtures thereof, are employed, the dimer product will contain 36 carbon atoms and the trimeric material will have 54 carbon atoms. Preferably the polymerized fatty acids used contain at least 90% by weight of dimer. Also there is a preference for the use of hydrogenated polymeric fatty acids.

Sometimes it is desirable, in connection with the viscosity control of the polyamide, also to incorporate a small percentage of a monocarboxylic acid or monoamine. The amount is, in addition, dependent on the monomer content of the polymerized fatty acids and is usually less than 10 mol. % of the total carboxylic acid component or amine component. These compounds will usually contain 6–20 carbon atoms.

The novel basic polyamides are prepared from the amines and carboxylic acids by conventional processes. Generally there is a very small molecular excess of amine or carboxylic acid present. Besides the amine and carboxylic acid, it is also possible to employ their functional derivatives, e.g. lower alkyl esters of the carboxylic acids or some salts of the amines. Generally the ingredients are brought together in a suitable reactor equipped with a condenser, stirrer, thermometer and inlet-tube for gas ($N_2$), and the reaction mixture heated to 170°–250° C., most generally 200°–210° C., and kept at that temperature for four hours, during which time the water of reaction distills off. Typically, a light-yellow viscous liquid is obtained, which is poured out, cooled to a hard, brittle material, broken and ground.

Polyamides thus obtained can be used in accordance with the invention for modifying polyalkenes by incorporating therein 0.5 to 10%, based on the weight of the polyalkene, of said polyamide and distributing it homogeneously therein. Preferably 3–8% by weight of the polyamide is incorporated in the polyalkene. At these low levels it is possible to significantly enhance the dyeability of the polyalkene without appreciably detracting from the other desirable physical properties of the polyalkene.

Polyalkenes which can be used include polypropylene, particularly isotactic polypropylene, polyethylene, poly(4-methylpentene-1), and the like. The invention is also adaptable for use with copolymers derived from ethylene, propylene and 4-methylpentene-1 variety of comonomers.

The incorporation of the polyamide can be effected by mixing it into the melt, by extruding together or milling together and the like. From the polyalkene thus modified, fibres, foils, films and other articles can be manufactured which possess improved dyeability with respect to dyes with acid groups. The invention thus provides dyed or undyed articles which consist completely or partly of modified polyalkene. It is also advantageous with the present invention, that it is not necessary to neutralize the instant polyamides, i.e. convert at least part of the amine group to salts, prior to use.

The invention is further illustrated by reference to the following examples.

EXAMPLES 1–7

A series of polyamides was prepared as described above, starting from the materials indicated in Table 1, the quantities being indicated in moles. For comparison, a polyamide (1) was prepared according to Example 1 of U.S. Pat. No. 3,433,853. For comparative Example (2) the relative amounts of amines were changed. Amine number, acid value, softening point (ball and ring), as well as the viscosity at 190° were determined and are also presented in the Table. Abbreviations used in the Tabe have the following meaning:
BAPMA = N,N'-bis(3-aminopropyl)methyl amine
HMDA = hexamethylenediamine
EDA = ethylenediamine
PDA = propanediamine

TABLE I

|  | Comp. (1) | Comp. (2) | 1 | 2 | 3 | 4 | 5 | 6 | 7 |
|---|---|---|---|---|---|---|---|---|---|
| Azelaic acid | 4.0 | 4.0 | 4.0 | 3.6 | 3.6 | 2.0 |  | 3.3 | 4.03 |
| Adipic acid |  |  |  |  |  | 2.0 |  |  |  |
| Sebacic acid |  |  |  |  |  |  | 4.0 |  |  |
| Stearic acid |  | 0.2 | 0.2 |  |  | 0.2 |  |  |  |
| Dimeric fatty acid |  |  |  | 0.4[1] | 0.4[1] |  | 0.4[2] | 0.7[1] |  |

TABLE I-continued

| | Comp. (1) | Comp. (2) | 1 | 2 | 3 | 4 | 5 | 6 | 7 |
|---|---|---|---|---|---|---|---|---|---|
| BAPMA | 2.28 | 2.57 | 2.57 | 2.57 | 2.57 | 2.57 | 2.57 | 2.21 | 2.66 |
| HMDA | 2.30 | 1.76 | | | | | | | |
| EDA | | | 1.75 | 1.76 | | 1.76 | | 1.83 | 1.28 |
| PDA 1,2 | | | | | | | 1.76 | | |
| PDA 1,3 | | | | | 1.76 | | | | |
| Amine number mgKOH/g | 113 | 115 | 123 | 119 | 134 | 140 | 122 | 90 | 115 |
| Acid Value mgKOH/g | 0.7 | 3.8 | 3.3 | 2.8 | 4.0 | 8.3 | 4.1 | 5.5 | 3.6 |
| Softening point °C. | 171 | 157 | 185 | 171 | 159 | 152 | 130 | 175 | 158 |
| Viscosity (Pa.s) (190° C.) | 5.3 | 4.6 | 5.2 | 5.2 | 1.15 | 0.75 | 2.85 | 4.9 | 4.3 |

[1] Fractionated and hydrogenated polymeric fatty acid (Dimer:Trimer:Monomer = 95:5:0.1)
[2] Non-hydrogenated polymeric fatty acid (Dimer:Trimer = 80:20)

The polyamides described above were added in amounts of 5%—calculated on the polyalkene—to isotactic polypropene and homogeneously distributed therein by milling at 175° C. for 8 to 10 minutes. A film of about 2 mm thickness was taken from the mill and this film was cut into test strips of about 2.5×4.0 cm. These test strips were dyed with Lissamine Blue B. For this purpose a 0.1% by weight solution of the dye in distilled water was prepared. To this solution was added 0.1% by weight of formic acid and the whole was diluted to 0.075% dye. The solution was brought to 100° C., whereafter the test strips were held in the bath for 4 hours at this temperature. At the end of that period they were taken out of the dye solution, rinsed and washed with soap. The dyeing result was judged visually for color intensity, color homogeneity and color fastness. The results appeared to vary very greatly, to wit from barely colored to streaky, light blue and glossy deep blue. The total impression was expressed in four gradations, passing from −, 0, + to +30 and were as follows:

| Comp. (1) | Comp. (2) | Ex. 1 | Ex. 2 | Ex. 3 | Ex. 4 | Ex. 5 | Ex. 6 | Ex. 7 |
|---|---|---|---|---|---|---|---|---|
| − | 0 | + | ++ | ++ | ++ | ++ | + | ++ |

We claim:

1. A solid polyamide having an acid value less than 10 and amine value from 75 to 150 consisting essentially of repeating groups obtained from:
   (a) an aliphatic diamine having 2 or 3 carbon atoms between the nitrogen atoms;
   (b) a triamine having the formula

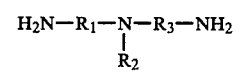

in which $R_1$, $R_2$ and $R_3$ are saturated hydrocarbon radicals containing from 1 to 6 carbon atoms;
   (c) an aliphatic dicarboxylic acid having from 6 to 19 carbon atoms; and
   (d) a polymeric fatty acid obtained by the polymerization of a $C_{18}$ unsaturated fatty acid and containing at least 75% by weight $C_{36}$ dimer acid; the molar ratio of (a) to (b) ranging from 0.4:1 to 1.5:1 and the polymeric fatty acid being present in an amount from 3 to 25 mol percent of the total dicarboxylic acids.

2. The polyamide of claim 1 wherein for the triamine (b) $R_1$ and $R_3$ are alkylene radicals having 2 to 4 carbon atoms and $R_2$ is a methyl group, and the molar ratio of (a) to (b) is from 0.4:1 to 0.8:1.

3. The polyamide of claim 2 wherein the aliphatic diamine is ethylene diamine.

4. The polyamide of claim 2 wherein the aliphatic dicarboxylic acid contains 6 to 12 carbon atoms.

5. The polyamide of claims 2, 3 or 4 wherein the triamine is N,N'-bis(3-aminopropyl)methyl amine.